United States Patent
Yea et al.

(10) Patent No.: US 8,290,248 B2
(45) Date of Patent: Oct. 16, 2012

(54) DETERMINING DISPARITY SEARCH RANGE IN STEREO VIDEOS

(75) Inventors: Sehoon Yea, Cambridge, MA (US); Dongbo Min, Daejeon (KR); Zafer Arican, Antalya (TR); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 410 days.

(21) Appl. No.: 12/651,200

(22) Filed: Dec. 31, 2009

(65) Prior Publication Data

US 2011/0158528 A1    Jun. 30, 2011

(51) Int. Cl.
*G06K 9/00*    (2006.01)
(52) U.S. Cl. ........ 382/154; 382/285; 382/294; 382/170; 382/218
(58) Field of Classification Search .................. 382/154, 382/285, 294, 218, 170; 348/46, E13.074
See application file for complete search history.

(56) References Cited

U.S. PATENT DOCUMENTS
2008/0240549 A1*  10/2008  Koo et al. ..................... 382/154

OTHER PUBLICATIONS

Beumier, "Speeding up Dense Disparity Estimation of Stereo Couples thanks to Horizontal Intensity Gradient", IEEE, 2009 Fifth International Conference on Signal Image Technology and Internet Based Systems.*

* cited by examiner

*Primary Examiner* — Matthew Bella
*Assistant Examiner* — Ruiping Li
(74) *Attorney, Agent, or Firm* — Dirk Brinkman; Gene Vinokur

(57) ABSTRACT

Embodiments of the invention disclose a system and a method for determining a disparity search range for a current stereo image of a scene based on a set of stereo images of the scene, comprising steps of: selecting a subset of stereo images from the set of stereo images, the subset includes the current stereo image and at least one neighboring stereo image, wherein the neighboring stereo image is temporally-neighboring to the current stereo image; determining a disparity histogram for each stereo image in the subset of stereo images to form a set of disparity histograms; determining a weighted disparity histogram as a weighted sum of the disparity histograms in the set of disparity histograms; and determining the disparity search range from the weighted disparity histogram.

19 Claims, 6 Drawing Sheets

100

DETERMINING DISPARITY SEARCH RANGE IN STEREO VIDEOS

FIELD OF THE INVENTION

This invention relates generally to stereo videos, and more particularly to determining disparity search ranges in the stereo videos.

BACKGROUND OF THE INVENTION

Dense disparity maps used for stereo matching are used in many applications, including image-based rendering, 3-D scene reconstruction, robot vision, and tracking. Such applications of the stereo matching often presume a knowledge of an appropriate disparity search range, or use a fixed range.

In practice, the disparity search range of a scene facilitates the use of number of the stereo matching methods. The lack of the disparity search range results in a need to search over a wider range of candidate disparity values, which generally requires more computation and memory. More importantly, most stereo matching methods are likely to get trapped in local minima when given an inappropriate search range, which can compromise a quality of the disparity map.

However, the determination of the disparity search ranges is a complex problem, especially when, for example, the scene or camera configuration changes over time. One conventional method for determining a maximum disparity range is based on statistical analysis of the spatial correlation between stereo images. However, that method assumes that there are only positive disparities between stereo images.

Another disparity search range estimation method is based on confidently stable matching. In that method, the disparity search range is determined by setting an initial search range to a size of the image, and then performing the matching in a hierarchical manner.

Other methods are based on depth estimation techniques that directly impose temporal constraints as part of the estimation process. However, such techniques are prone to false matches, and incorrect estimation results without appropriate search ranges.

Accordingly, it is desired to provide a method for determining the disparity search range in the stereo video.

SUMMARY OF THE INVENTION

Embodiments of the invention are based on the realization that a disparity search range can be more reliably determined from a weighted disparity histogram based on a weighted sum of temporally-neighboring disparity histograms, where the weights are determined by enforcing temporal consistency based on similarities of depth distribution between the temporally-neighboring disparity histograms.

Embodiments of the invention disclose a system and a method for determining a disparity search range for a current stereo image of a scene based on a set of stereo images of the scene, comprising steps of: selecting a subset of stereo images from the set of stereo images, the subset includes the current stereo image and at least one neighboring stereo image, wherein the neighboring stereo image is temporally-neighboring to the current stereo image; determining a disparity histogram for each stereo image in the subset of stereo images to form a set of disparity histograms; determining a weighted disparity histogram as a weighted sum of the disparity histograms in the set of disparity histograms; and determining the disparity search range from the weighted disparity histogram.

DETAILED DESCRIPTION OF THE PREFERRED EMBODIMENT

Embodiments of the invention are based on the realization that a disparity search range can be more reliably determined from a weighted disparity histogram based on a weighted sum of temporally-neighboring disparity histograms, where the weights are determined by enforcing temporal consistency based on similarities of depth distribution between the temporally-neighboring disparity histograms.

Figure 1A:
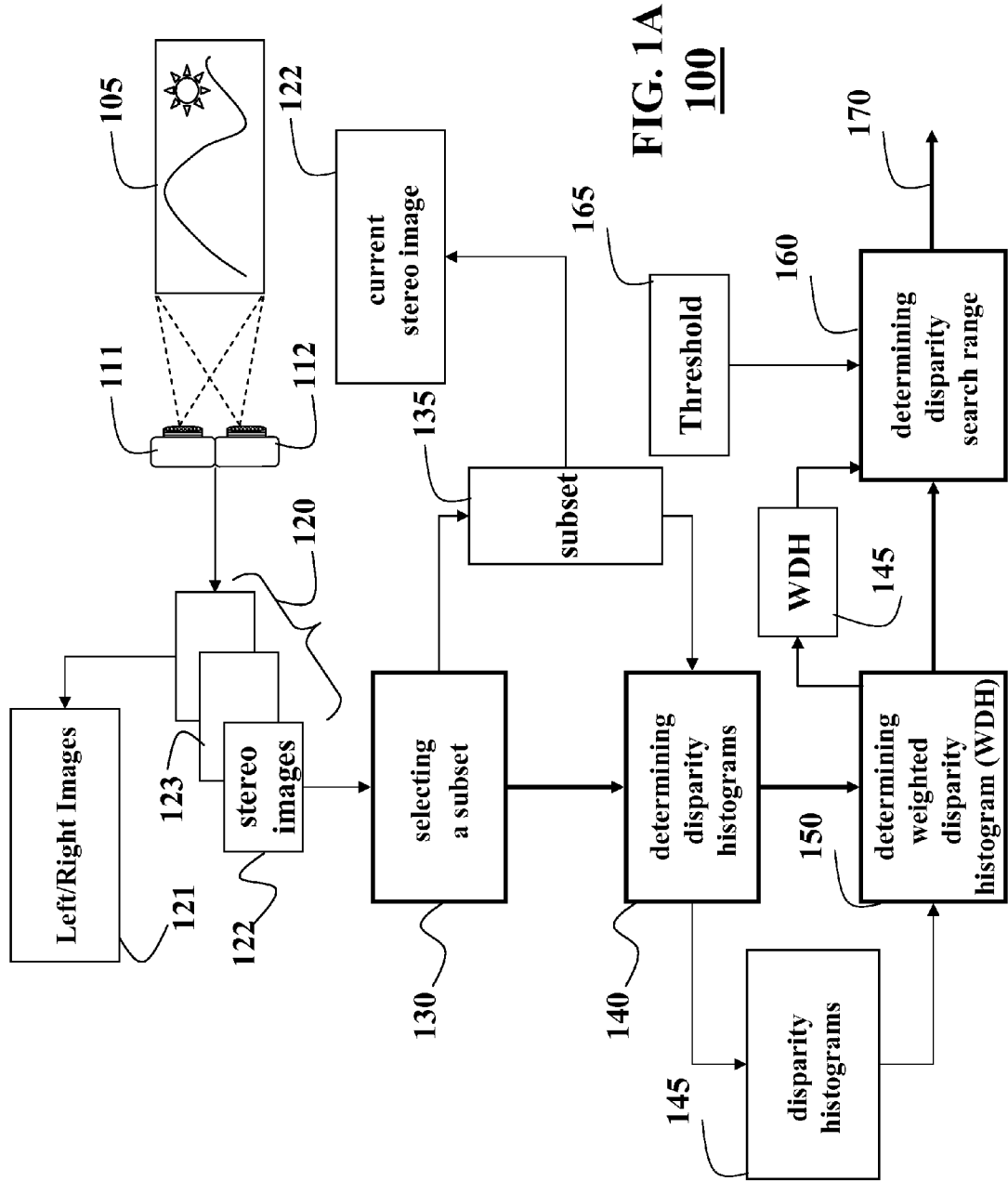
FIG. 1A is a block diagram of a method for determining a disparity search range according to an embodiment of the invention.

FIG. 1A shows a block diagram of a method 100 for determining the disparity search range according to an embodiment of the invention. The steps of the method can be performed in a processor including memory and input/output interface as known in the art.

A stereo video including a set 120 of stereo images of a scene 105 is acquired by a right camera 112 and a left camera 111. Each stereo image 121 includes a right image acquired by the right camera and a left image acquired by the left camera.

A subset of stereo images is selected 130 from the set of stereo images. The subset includes a current stereo image 122 and at least one neighboring stereo image 123. The neighboring stereo image is temporally-neighboring to the current stereo image. In one embodiment, the neighboring stereo image are adjacent, e.g., previous, current and next.

For example, in one embodiment, the subset of stereo images includes the current stereo image, a previous stereo image and a next stereo image. In another embodiment, the subset includes only previous stereo images, e.g., two previous stereo images. However, other embodiments select the subset 135 differently.

For each stereo image in the subset of stereo images, a disparity histogram is determined 140 forming a set of disparity histograms 145. Based on the set of disparity histograms a weighted disparity histogram 155 is determined 150 as a weighted sum of the disparity histograms.

Based on a threshold 165, the disparity search range 170 is determined from the weighted disparity histogram. After the determining the disparity search range for the current stereo image, the current stereo image is updated with another stereo image from the set 120, e.g., a next stereo image, and the determining steps of the method 100 are repeated.

Figure 1B:
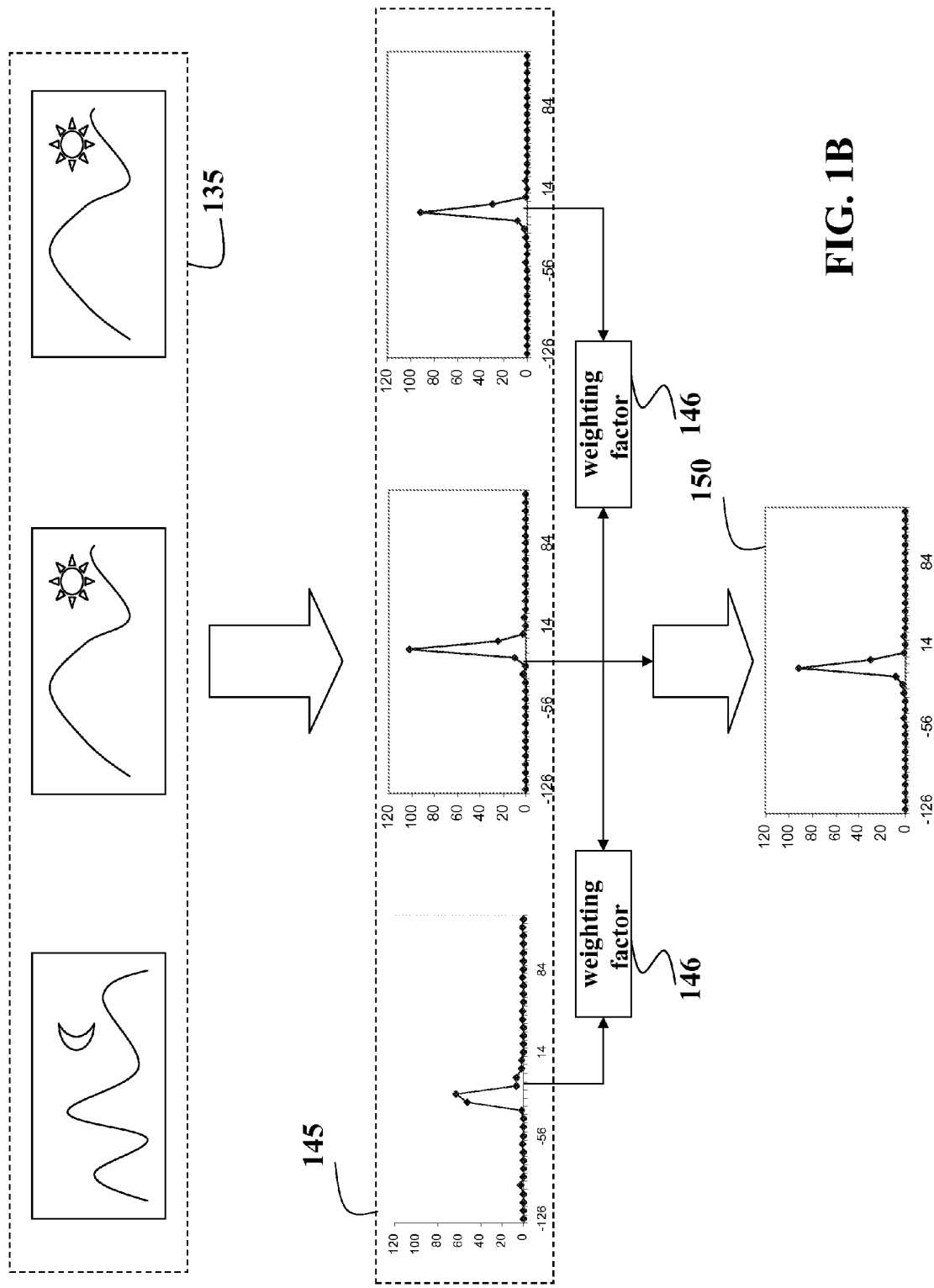
FIG. 1B is a schematic of determining a weighted disparity histogram.

FIG. 1B schematically shows the determining of the weighted disparity histogram 150. In one embodiment, the weighted disparity histogram is determined based on a set of weighting factors 146. As described in more details below, the weighting factor is determined for each pair of disparity histograms in the set of disparity histograms, and represents a similarity between histograms in that pair. In one embodiment, the pair of disparity histograms includes a disparity histogram corresponding to the current stereo image.

Determining Disparity Histogram

Disparity Histogram Based on Sparse Feature-Matching

Figure 2A:
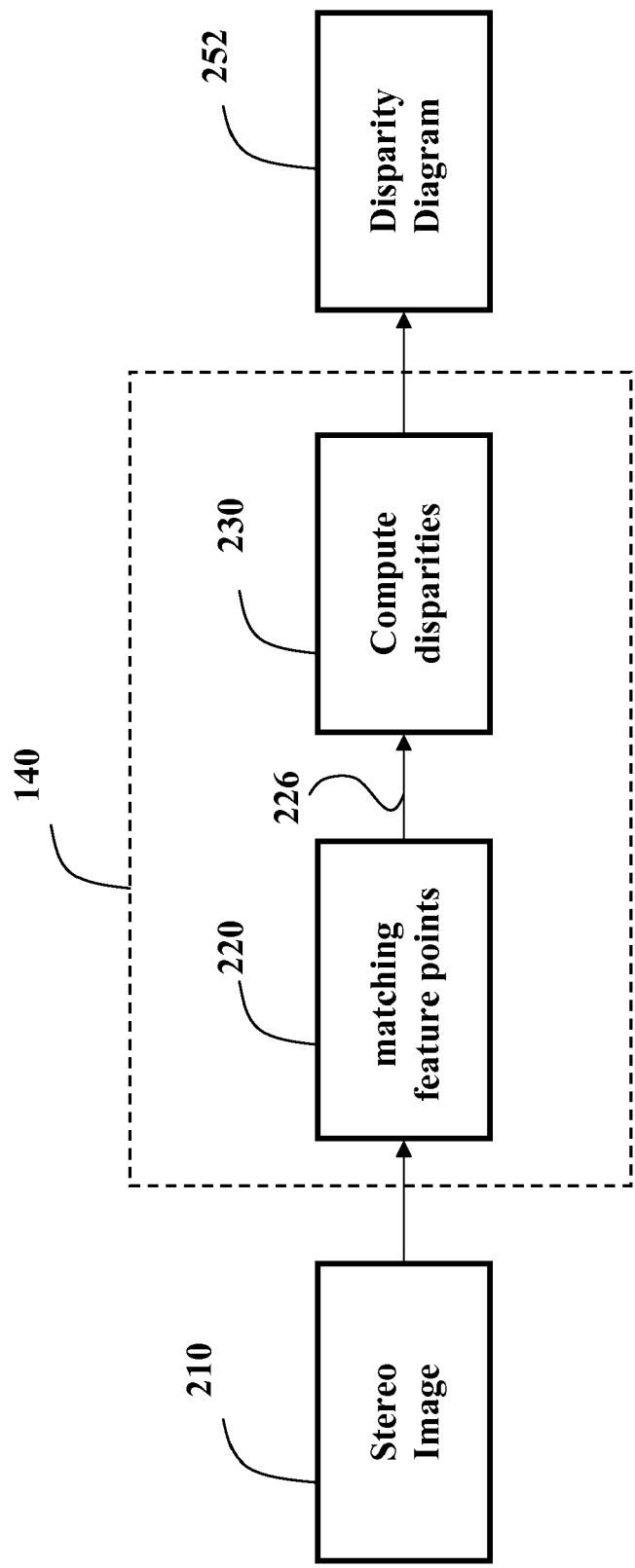
FIG. 2A is a block diagram of a method for determining a disparity diagram using a sparse feature-matching according to one embodiment of the invention.

FIG. 2A shows a block diagram of a method for determining 140 a disparity diagram 252 using a sparse feature-matching according to one embodiment of the invention. An initial set of matching feature points 220 is computed from a stereo image 210 by a sparse feature matching method such as KLT (Kanade-Lucas-Tomasi) and SURF (Speeded up Robust Features).

The sparse feature matching methods define a descriptor for points-of-interest, and track the points using gradient or nearest-neighborhood methods to determine a disparity map 226. For example, SURF is a scale and rotation invariant detector and descriptor of points-of-interests. SURF uses a Hessian matrix-based measure and a distribution-based descriptor.

Using N pairs of the matching feature points, the disparity histogram is computed 230 according to $$h[i] = \sum_{j=1}^{N} f\left(D(i), \left\lfloor \frac{d_j}{B} \pm 0.5 \right\rfloor \cdot B\right) \qquad (1)$$

$$i = 1, 2, \ldots M$$

where h[i] is a histogram count for a bin i, M is a total number of bins, and a function $f(a, b)$ equals 1, if a=b, and 0 otherwise. By quantizing each disparity value $d_j$ of a matching-points pair with a size B of the bin, a histogram bin count with a closest representative value D(•) is incremented by one.

Disparity Histogram Based on Dense Feature-Matching

Figure 2B:
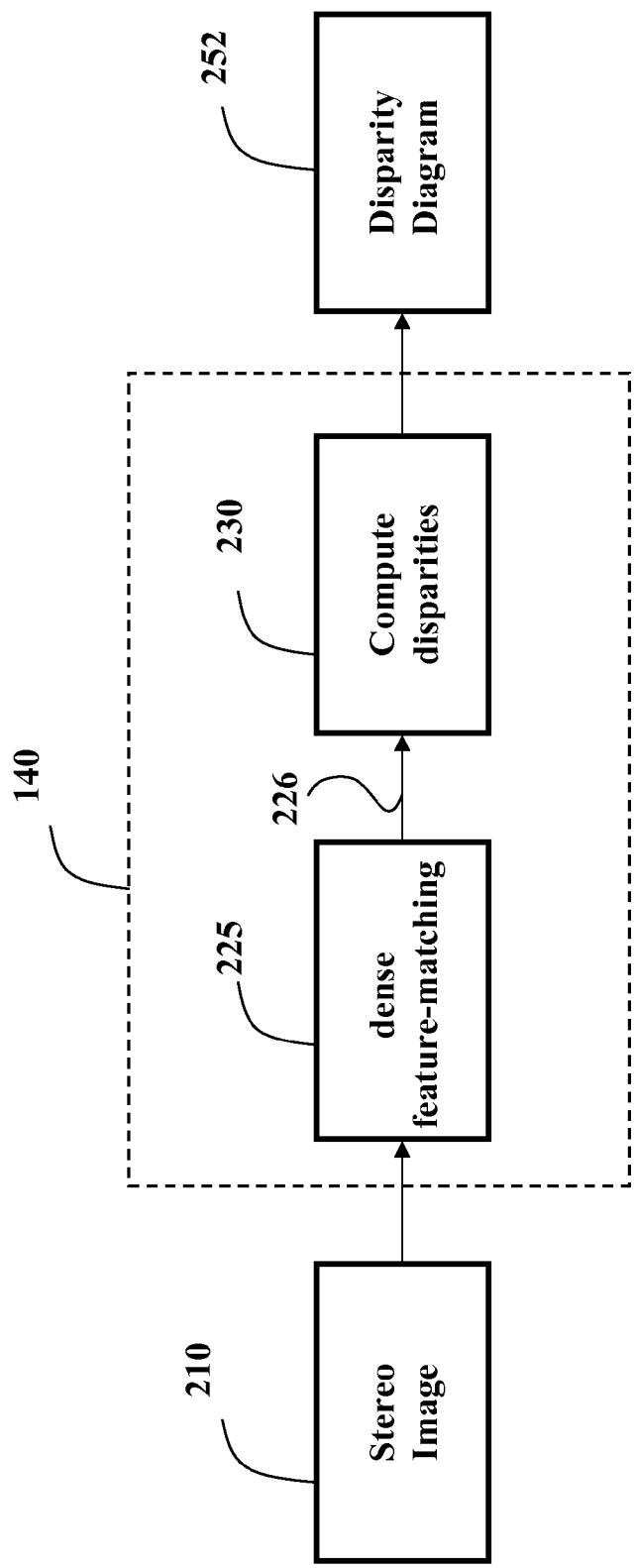
FIG. 2B is a block diagram of a method for determining of the disparity histogram based on dense feature-matching according to one embodiment of the invention.

FIG. 2B shows determining of the disparity histogram based on dense feature-matching methods 225. Different dense feature-matching methods, e.g., based on graph cuts, belief propagation, and cost-aggregation, are used by embodiments of the invention to determine the disparity map 226.

In one embodiment, to reduce computation, the disparity map is computed on a sub-sampled version of the stereo images. Because the dense feature-matching methods find matching points in the right image for all the points in the left image (or vice versa), there is sufficient number of matching-point pairs to determine the disparity map. Using the pairs of the matched feature points, the disparity histogram is computed according to Equation (1).

Enforcing Temporal Consistency

If the disparity search range R has unnecessary disparities or misses significant ones, the feature matching methods can be trapped in local minima. Therefore, it is important to have a reliable estimate of the disparity search range R for each current stereo image.

Accordingly, some embodiments of the invention enforce a temporal consistency among the disparity histograms of temporally-neighboring stereo images such that the feature-matching methods are used in a temporally consistent manner.

In one embodiment, the weighted disparity histogram is determined by calculating weighted sums of temporally-neighboring histograms using the weighting factors 146 determined based on similarity of disparity distributions between the stereo images.

The disparity distribution of a scene depends on a change in the scene or a camera configuration, and is represented by the disparity histogram. Therefore, the similarity of the disparity histograms is used to identify changes in the scene or in the configuration of the camera, and to reduce effects of outliers.

Figure 3:
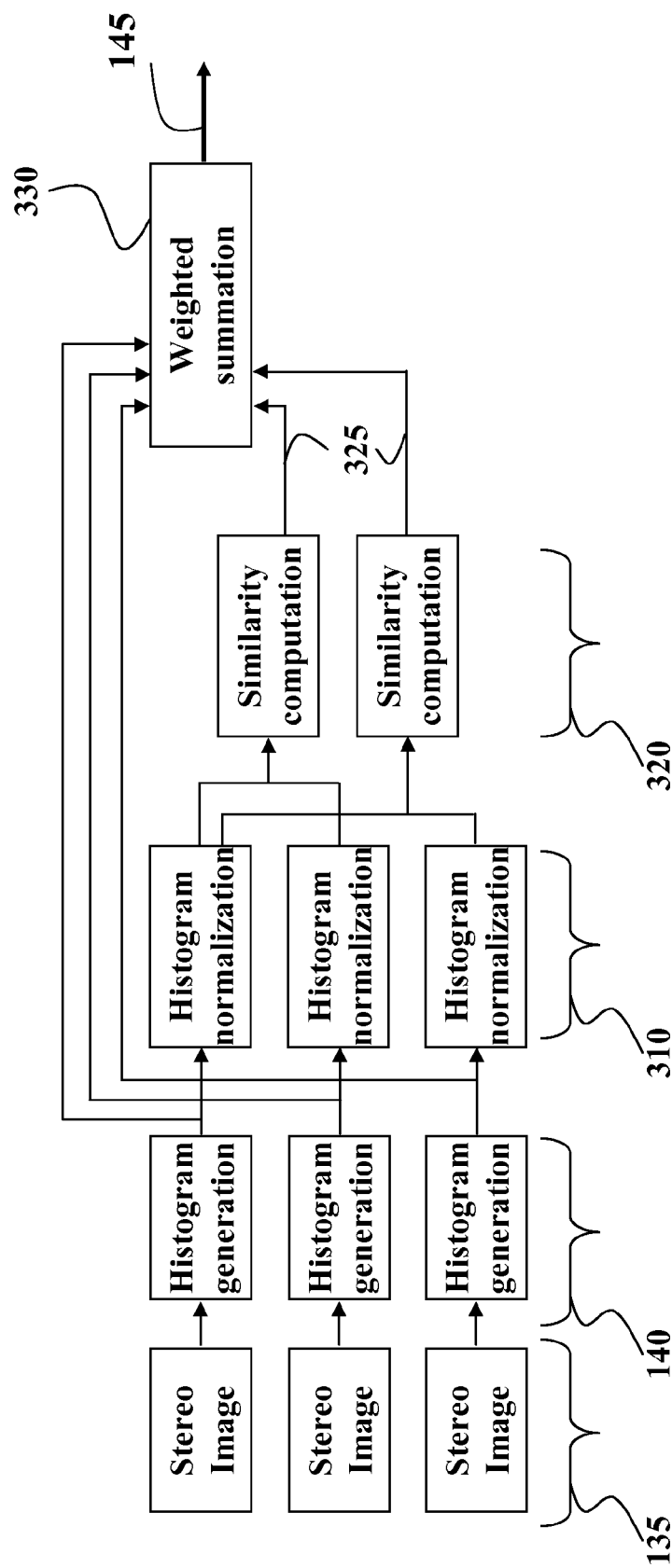
FIG. 3 is a block diagram of a method for determining the weighted disparity histogram according one embodiment of the invention.

FIG. 3 shows a method for determining the weighted disparity histogram according one embodiment of the invention. For each stereo image in the subset of stereo images 135, the disparity histograms 145 are determined 140 and normalized 310 because total numbers of matching points vary among temporally-neighboring stereo images.

In one embodiment, the weighting factor is determined for each pair of disparity histograms in the subset of disparity histograms producing a set of weighting factors. In another embodiment, the each pair of disparity histograms includes a current disparity histogram corresponding to the current stereo image.

In yet another embodiment, the disparity histograms in the subset of disparity histograms are normalized and the set of weighting factors is determined according to a normalized difference between the each pair of disparity histograms, wherein the weighting factor is inversely proportional to the normalized difference.

In this embodiment, the weighting factors w 325 is determined 320 according to $$w_{n,p} = \exp\left(-\sum_{i}^{M} |h_n^{nor}(i) - h_p^{nor}(i)|/\sigma_S\right), \qquad (2)$$

wherein $w_{n,p}$ is the weighting factor, n is an index for the current disparity histogram, p is an index for one of the temporally-neighboring disparity histograms, $\sigma_S$ is a weighting constant, $h_n^{nor}$ and $h_p^{nor}$ are the normalized disparity histograms for the current stereo image and temporally-neighboring stereo image, respectively, i is an index for the histogram bins and M is the total number of histogram bins. Typically, the value of the waighting factor $w_{n,p}$ is in a range from 0 to 2.

In another embodiment, Kullback-Leibler divergence, which represents the similarity of two probability distributions, is used to compute the weighting factors according to $$w_{n,p} = \exp\left(-\sum_{i}^{M} h_n^{nor}(i) \log \frac{h_n^{nor}(i)}{h_p^{nor}(i)}\right). \qquad (4)$$

The weighted disparity histogram $h_p^w(i)$ 145 is determined as a weighted summation 330 of temporally-neighboring histograms according to $$h_p^w(i) = \sum_{n \in N(p)} w_{n,p} h_n(i), \qquad (3)$$

wherein n is the disparity histogram in the set of disparity histograms N(p).

Determining Disparity Search Ranges

Figure 4:
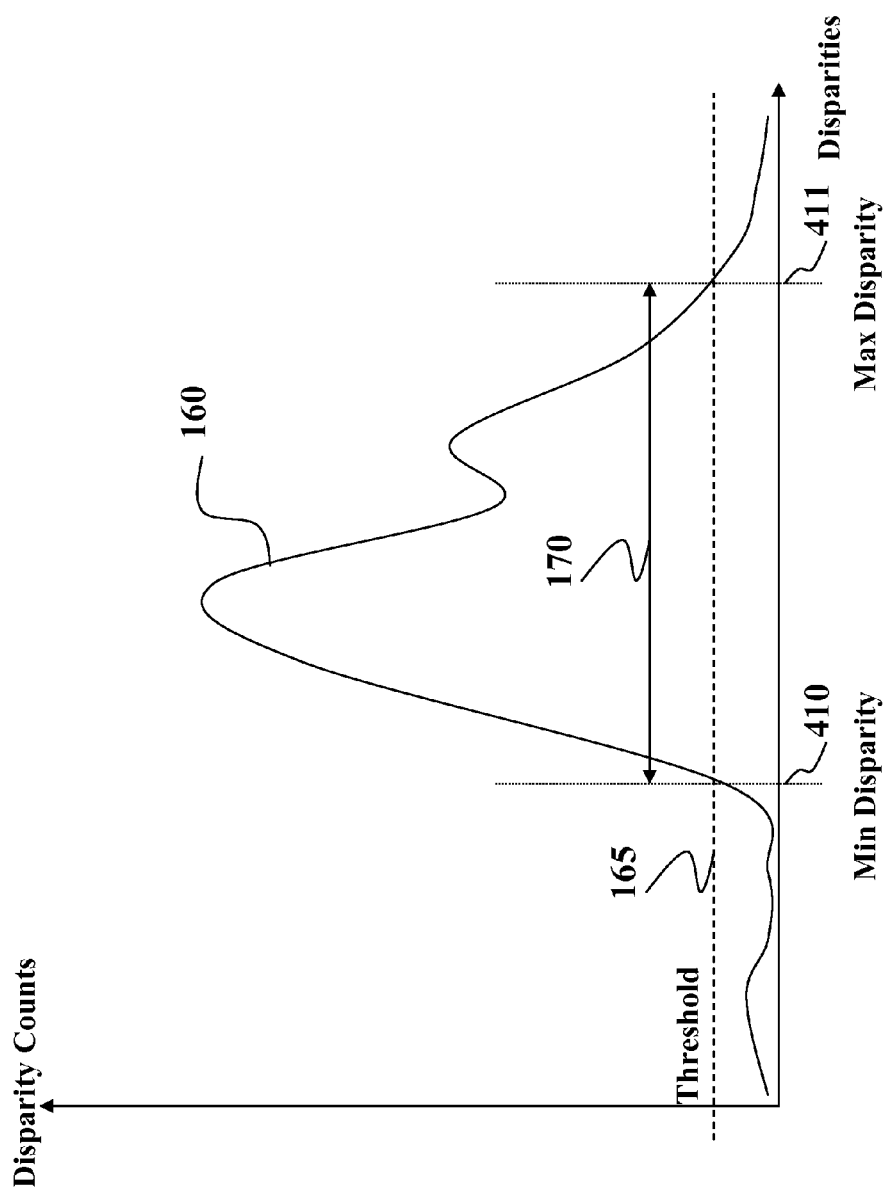
FIG. 4 is a schematic of determining the disparity search range from the weighted disparity histogram using a threshold according one embodiment of the invention.

FIG. 4 shows a histogram 160 that can be used for determining the disparity search range 170 using a threshold 165. In one embodiment, the threshold is determined based on an assumption that points with positive disparity are more important than the points with negative disparity since the human visual system (HVS) is more sensitive to objects that are nearby. Accordingly, the threshold T is determined according to $$T_h = \begin{cases} 2B, & \text{if } d < 0 \\ \lfloor B/2 \rfloor + 1, & \text{otherwise,} \end{cases} \quad (5)$$

where B is the size of the bin, and d is a disparity value that corresponds to a bin in the weighted disparity histogram.

Then, the disparity search range R is determined according to $$R = \{k | D(i) - B/2 \leq k \leq D(i) + B/2, h[i] > T_h\}, \quad (6)$$

where D(i) is a representative disparity value of a histogram bin, i is an index for the histogram bins, h[i] is a bin count, and $T_h$ is the threshold value defined in Equation (5), and $\{k\}$ represents a set of disparity values that satisfy the given constraints.

The disparity search range defined by Equation (6) considers the disparity values that are associated with histogram bins h[i] that are larger than the threshold $T_h$ as part of the set $\{k\}$. The set is expanded by ±B/2 to account for quantization effects resulting from the bin size.

One embodiment excludes isolated values of the weighted disparity histogram from being part of the disparity search range. For example, if a value h[i] of the histogram is above the threshold, but adjacent values h[i+1] and h[i−1] are below the threshold, the value h[i] is considered to be not reliable and excluded from the disparity search range.

Another embodiment uses additional constraints on the disparity search range determined according to Equation (6), e.g., all disparity values between a maximum disparity value 410 and a minimum disparity value 411 are included in the disparity search range.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining a disparity search range for a current stereo image of a scene based on a set of stereo images of the scene, comprising steps of:
    selecting a subset of stereo images from the set of stereo images, the subset includes the current stereo image and at least one neighboring stereo image, wherein the neighboring stereo image is temporally-neighboring to the current stereo image;
    determining a disparity histogram for each stereo image in the subset of stereo images to form a set of disparity histograms;
    determining, for each pair of disparity histograms in the subset of disparity histograms, a weighting factor representing a similarity between histograms in the pair of the disparity histograms to produce a set of weighting factors;
    determining a weighted disparity histogram as a weighted sum of the disparity histograms in the set of disparity histograms based on the set of the weighting factors and the set of disparity histograms; and
    determining the disparity search range from the weighted disparity histogram, wherein the steps are performed by a processor.

2. The method of claim 1, wherein the each pair of disparity histograms includes a current disparity histogram corresponding to the current stereo image.

3. The method of claim 1, further comprising:
    normalizing the disparity histograms in the subset of disparity histograms; and
    determining the set of weighting factors according to a normalized difference between the each pair of disparity histograms, wherein the weighting factor is inversely proportional to the normalized difference.

4. The method of claim 3, wherein the weighting factor for each pair of disparity histograms is determined according to $$w_{n,p} = \exp\left(-\sum_{i}^{M} |h_n^{nor}(i) - h_p^{nor}(i)| / \sigma_S\right),$$

wherein $w_{n,p}$ is the weighting factor, n is an index of a disparity histogram corresponding to the current stereo image, p is an index of a disparity histogram corresponding to the neighboring stereo image, $\sigma_S$ is a weighting constant, $h_n^{nor}$ and $h_p^{nor}$ are the normalized disparity histograms. i is an index of histogram bins and M is total number of histogram bins.

5. The method of claim 3, wherein the weighting factor for each pair of disparity histograms is determined according to $$w_{n,p} = \exp\left(-\sum_{i}^{M} h_n^{nor}(i) \log \frac{h_n^{nor}(i)}{h_p^{nor}(i)}\right),$$

wherein $w_{n,p}$ is the weighting factor, n is an index of a disparity histogram corresponding to the current stereo image, p is an index of a disparity histogram corresponding to the neighboring stereo image, $h_n^{nor}$ and $h_p^{nor}$ are the normalized disparity histograms, i is an index of histogram bins and M is total number of histogram bins.

6. The method of claim 3, further comprising:
    determining the weighted disparity histogram $h_p^w$ (i) according to $$h_p^w(i) = \sum_{n \in N(p)} w_{n,p} h_n(i),$$

wherein n is the disparity histogram in the set of disparity histograms N(p).

7. The method of claim 1 wherein each stereo image includes an image acquired by a right camera and an image acquired by a left camera.

8. The method of claim 1, further comprising:
    updating the current stereo image and the subset of stereo images; and
    repeating the determining steps.

9. The method of claim 1, wherein the subset of stereo images includes a previous stereo image and a next stereo image.

10. The method of claim 1, wherein the subset of stereo images includes only previous stereo images.

11. The method of claim 1 further comprising:
    determining the disparity histogram according to $$h[i] = \sum_{j=1}^{N} f\left(D(i), \left\lfloor \frac{d_j}{B} \pm 0.5 \right\rfloor \cdot B\right)$$

$$i = 1, 2, \ldots M,$$

wherein h[i] is a histogram count for a bin i, M is a total number of bins, and a function f(a, b) equals 1, if a=b, and 0 otherwise, $d_j$ is a disparity value of j-th matching feature-point pair, N is the total number of the matching feature-point pairs, B is a size of the bin, and wherein a histogram bin count with a closest representative value D(•) is incremented by one.

12. The method of claim 1, further comprising:
determining matching feature-points based on a sparse feature-matching.

13. The method of claim 1, further comprising:
determining matching feature-points based on a dense feature-matching.

14. The method of claim 1, further comprising:
determining a threshold T according to a size of a histogram bin in the weighted disparity histogram and a disparity value of the histogram bin.

15. The method of claim 14, further comprising:
determining the threshold T according to $$T_h = \begin{cases} 2B, & \text{if } d < 0 \\ [B/2] + 1, & \text{otherwise,} \end{cases}$$

wherein B is the size of the histogram bin, and d is the disparity value of the histogram bin.

16. The method of claim 1, wherein bins of the disparity histograms and the weighted disparity histogram are associated with a disparity value.

17. The method of claim 14, further comprising:
determining a set of disparity values of the weighted disparity Histogram, wherein a bin count for each value in the set of disparity values is greater than the threshold;
determining the disparity search range based on the set of values and a size of the histogram bin.

18. The method of claim 17, further comprising:
determining the disparity search R according to $$R = \{k | D(i) - B/2 \leq k \leq D(i) + B/2, h[i] > T_h\},$$

wherein D(i) is a value of the bin h[i] of the weighted disparity histogram, i is an index for the histogram bin, $T_h$ is the threshold, and {k} is the set of disparity values.

19. A system for determining a disparity search range for a current stereo image of a scene based on a set of stereo images of the scene, comprising:
means for selecting a subset of stereo images from the set of stereo images, the subset includes the current stereo image and at least one neighboring stereo image, wherein the neighboring stereo image is temporally-neighboring to the current stereo image;
means for determining a disparity histogram for each stereo image in the subset of stereo images to form a set of disparity histograms;
means for determining a weighted disparity histogram as a weighted sum of the disparity histograms in the set of disparity histograms;
means for determining a threshold T according to a size of a histogram bin in the weighted disparity histogram and a disparity value of the histogram bin; and
means for determining the disparity search range from the weighted disparity histogram, wherein the means for determining the disparity search range includes a processor.

* * * * *